Sept. 25, 1951     J. W. FRIED     2,568,886
DRILL PRESS ATTACHMENT
Filed June 16, 1947
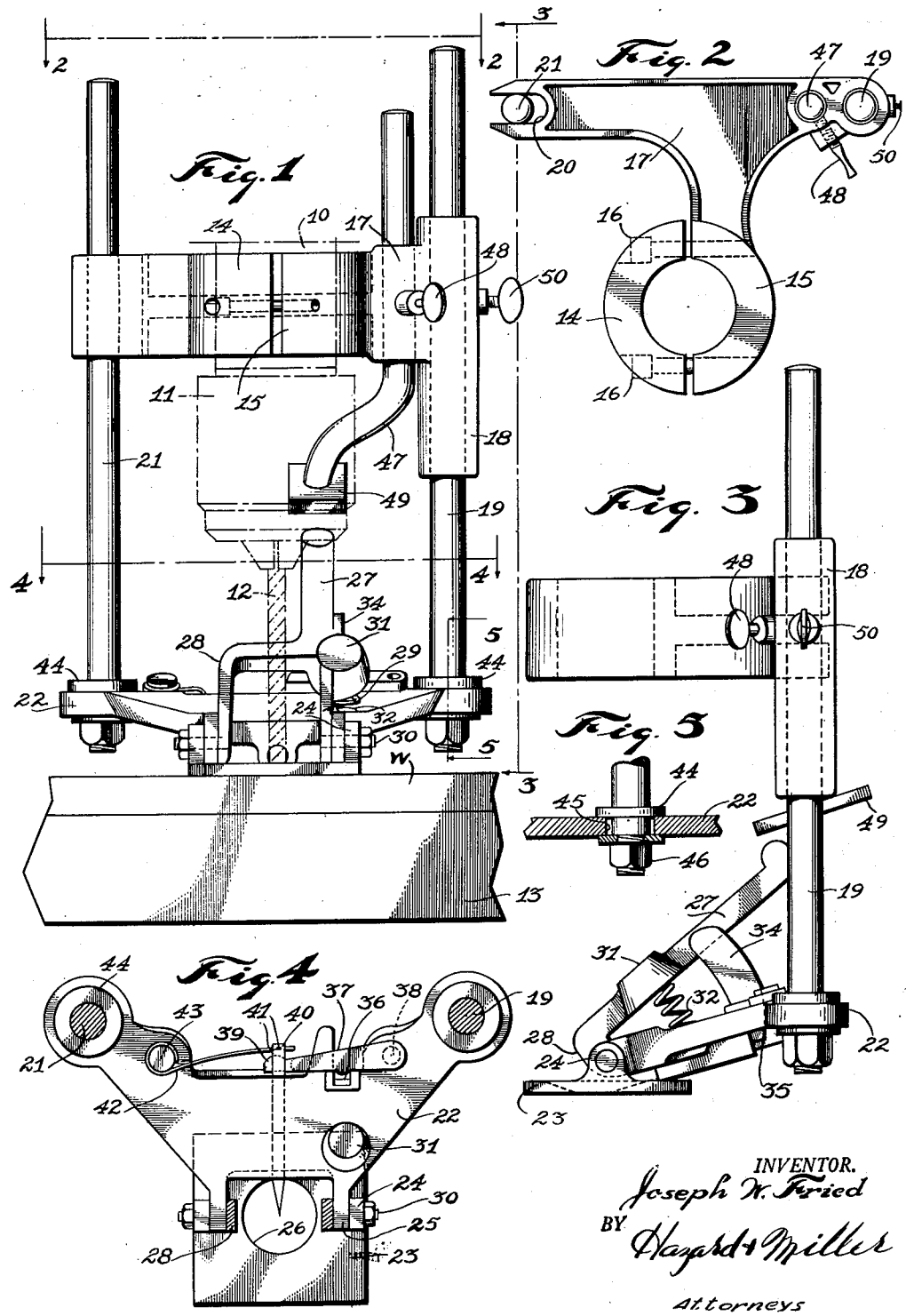

Patented Sept. 25, 1951

2,568,886

UNITED STATES PATENT OFFICE 2,568,886

DRILL PRESS ATTACHMENT

Joseph W. Fried, Los Angeles, Calif.

Application June 16, 1947, Serial No. 754,879

2 Claims. (Cl. 77—55)

This invention relates to improvements in drill presses and particularly to drill press attachments.

An object of the invention is to provide a device which is applicable to a conventional drill press and which carries a retractible indicator adapted to be positioned over the work on the drill press table and which will indicate the axis of rotation of the drill so that the work may be easily centered on the drill press table with respect to the indicator and consequently with respect to the center of the path of the drill. This indicator is retractible or movable out of the path of the drill as the drill descends toward the work in drilling.

Another object of the invention is to provide a means for automatically retracting the indicator out of the path of the drill as the drill descends toward the work.

Another object of the invention is to provide an attachment for drill presses wherein there is a presser plate or hold-down that is applicable to the work on the drill press table and which as the quill of the drill press descends is caused to apply pressure to the work to, in effect, clamp it against the drill press table thus holding it against displacement during the process of drilling. This pressure that is applied by means of the presser plate is not applied until the drill closely approaches the work so that prior to the time that the drill is about to commence drilling through the work, the work is still free to be adjusted and centered with respect to the indicator and consequently the center of the drill.

Another object of the invention is to provide an attachment for drill presses having the above mentioned characteristics which is of relatively simple, durable construction and which can be easily applied to any conventional form of drill press having a quill within which the spindle of the drill press is rotatable.

With the foregoing and other objects in view, which will be made manifest in the following detailed description and specifically pointed out in the appended claims, reference is had to the accompanying drawings for an illustrative embodiment of the invention, wherein:

Figure 1 is a view in front elevation of the attachment embodying the present invention and illustrating in dotted lines portions of a conventional drill press to which the attachment has been applied;

Fig. 2 is a top plan view of the attachment;

Fig. 3 is a view in side elevation of the same;

Fig. 4 is a horizontal section taken substantially upon the line 4—4 upon Fig. 1; and Fig. 5 is a partial view in vertical section taken substantially upon the line 5—5 upon Fig. 1.

Referring to the accompanying drawings wherein similar reference characters designate similar parts throughout, 10 indicates the quill of a conventional drill press within which is rotatable a spindle (not shown) to which is attachable the chuck 11. A drill 12 is illustrated as having been mounted in the chuck and the table of the drill press is indicated at 13. The work to be drilled is indicated at W.

The attachment embodying the present invention comprises a split collar, the parts of which are indicated at 14 and 15, and which are adapted to be connected together such as by bolts 16. This collar is adapted to be applied about the quill 10 and rigidly attached thereto on tightening the bolt 16 so as to be vertically movable therewith. On the part 15 of the collar there is an arm 17 one side of which provides a sleeve 18 for a vertically slidable guide rod 19. The other side of the arm is recessed as at 20 to receive a companion guide rod 21 which is also vertically slidable with relation to the arm 17. The lower ends of these guide rods are connected in the manner illustrated in Fig. 5 to a casting 22 which extends forwardly to a point adjacent the axis of the drill 12. A foot or presser plate 23 has upstanding ears 24 that register with ears 25 on the forward side of the casting 22 so that the presser plate is pivotally mounted on the casting and may accommodate itself to the top surface of the work W. In this presser plate there is a large central aperture 26 of such a size as to accommodate any ordinary size of drill that may be mounted in the chuck 11. A bifurcated arm 27 has its legs 28 and 29 aligned with the ears 25 on the casting 22 and the bolts 30 which extend through the ears 24 and 25 also extend through the legs 28 and 29 to pivotally mount the arm 27 on the casting 22. This arm assumes a normal position extending upwardly and rearwardly over the casting 22 and carries a pad 31 constituting one spring seat for a heavy compression spring 32 the lower end of which is seated at 33 on the casting 22.

The arm 27 carries an arcuate or quadrant-shaped member 34 the center of curvature of which is coincident with the axis of swinging movement of the arm 27 on the bolts 30. The rear edge of this member 34 has its lower end somewhat cammed as indicated at 35. This member is adapted to swing downwardly when the arm 27 is depressed through a notch 36 in the rear edge of casting 22. A lever 37 is pivotally mounted on the casting 22 at 38 and has a finger 39 that extends through a slot in an indicator or stylus 40 ahead of a pin 41 that extends therethrough. This indicator or stylus is urged into its forwardmost position by means of a spring 42 that is anchored on the casting 22 at 43. The forward end of the stylus is sharpened to a point that is designed to assume a normal position in vertical alignment with the axis of the drill 12.

As illustrated in Fig. 5, the lower ends of the guide rods 19 and 21 are shouldered as at 44 and below these shoulders the guide rods extend through apertures with considerable clearance indicated at 45 so that on loosening the nuts 46 the guide rods will enable the casting 22 to be laterally adjusted with relation thereto so as to accurately locate the end of the indicator or stylus 40 with respect to the axis of the drill.

A depresser rod 47 is also slidably adjustable through the arm 17 and is held in any adjusted position by means of a thumb screw 48. This depresser rod carries a foot 49 that is preferably inclined, as illustrated in Fig. 3, and which is engageable with the top of the arm 27. A thumb screw 50 is mounted on the sleeve 18 and is engageable with the guide rod 19 to hold the guide rod 19 and consequently the casting 22 and guide rod 21 in any elevated position. However, this thumb screw during normal operation is left loose so that the guide rods 19 and 21 are vertically slidable with relation to the collar and consequently with relation to the quill 10.

The operation of the above described construction is substantially as follows: The work W may be assumed to have the center of the hole to be drilled accurately located thereon. This location may be made by intersecting scribe marks or by a prick punch. The work is positioned on the table 13 and in so doing the casting 22 is bodily lifted, causing the guide rods 19 and 21 to slide upwardly with relation to the collar. When the work has been positioned on the table the casting 22 and the guide rods are allowed to descend by gravity so that the presser plate 23 rests on top of the work. In this position the work may be adjusted to accurately locate the prick punch mark or the equivalent exactly beneath the pointed end of the indicator or stylus 40. The drill press is then operated in the conventional manner to lower the quill 10 and thus advance the drill 12 toward the work. During this descent the collar on the quill merely slides downwardly with relation to the guide rods 19 and 21. As the drill 12 closely approaches the work the foot 49 engages the end of the arm 27 causing this arm to swing downwardly about the bolts 30 as centers. This compresses the spring 32 causing the downward force transmitted thereby to be applied through the presser plate 23 to the work. I find it advantageous to have the presser plate 23 apply a pressure of approximately forty pounds per square inch for ordinary drilling. This pressure causes the work W to be pressed firmly against the table 13 and the work is thus held against displacement. During the downward swinging movement of the arm 27 the cammed rear edge 35 at the bottom of the member 34 is effective to swing the lever 37 rearwardly about its pivot 38. The rearward swinging movement of the lever 37 causes the indicator or stylus 40 that is slidable in the casting 22 to be retracted so that as the drill approaches the indicator the indicator is drawn out of the path of the approaching drill. The rearward movement of the indicator 40 continues only so long as the lever 37 is engaged by the cam edge 35. Above this cam edge the rear edge of member 34 is concentric with relation to the bolts 30 so that further downward movement of the arm 27 does not involve any further rearward movement of the indicator 40 after it has been drawn out of the path of the drill. With the indicator thus withdrawn and pressure applied to the work W the drill then enters the work to drill the hole therethrough. After the hole has been drilled, upward movement of the quill 10 serves to withdraw the drill from the hole. However, pressure exerted by the compressed spring 32 remains applied until the drill 12 has been completely withdrawn from the work. During the upward movement of the quill the foot 49 is lifted, allowing the spring 32 to return to its normal position as illustrated in Fig. 3. When it reaches this uppermost or normal position the cam edge 35 permits spring 42 to return the indicator or stylus 40 and the lever 37 to their normal positions. In these normal positions the pointed end of the indicator is ready to again indicate the axis of the drill 12 so that the work W may be centered with relation thereto. Adjustment of the rod 47 by means of the thumb screw 48 enables the arm 27 to be actuated in proper time with relation to the end of the drill 12 approaching the work. The adjustable connection between the guide rods 19 and 21 and the casting 22 enables the casting to be adjusted sufficiently to accurately locate the end of the stylus with respect to the axis of the drill. If it is desired to support the attachment in elevated position while applying or removing the work W to or from the table 13, the attachment may be locked in the elevated position by tightening the screw 50.

From the above described construction it will be appreciated that the improved attachment will greatly facilitate the centering of the work W with relation to the drill 12. When the work has been centered with relation to the indicator and the drill approaches the work, pressure is applied to the work to hold the work in adjusted position and the indicator 40 is automatically retracted or withdrawn from the path of the drill.

Various changes may be made in the details of construction without departing from the spirit and scope of the invention as defined by the appended claims.

I claim:

1. A drill press attachment comprising supporting means attachable to a drill press quill so as to be raised and lowered therewith, a presser foot mounted thereon for adjustment relatively thereto, an indicator movably mounted on the supporting means toward and away from the presser foot adapted to assume a position beneath the axis of a drill mounted on the drill press or a position remote therefrom, means urging the indicator to its position beneath the axis of the drill, retracting means for retracting the indicator into its remote position, and means adjustably mounted on the supporting means for actuating the retracting means as the quill advances the drill toward the presser foot.

2. A drill press attachment comprising a clamp attachable to a drill press quill so as to be raised and lowered therewith, means adjustably mounted on the clamp for adjustment relatively thereto in a direction parallel to the axis of the quill, a presser foot pivotally mounted upon said means, an indicator movably mounted upon said means toward and away from the presser foot, spring means urging the indicator to a position beneath the axis of a drill mounted on the drill press, retracting means for retracting the indicator from its position beneath the drill, and means adjustably mounted on the clamp engageable with the retracting means to effect a retraction of the indicator as the quill advances its drill toward the work.

JOSEPH W. FRIED.

REFERENCES CITED

The following references are of record in the file of this patent:

UNITED STATES PATENTS

| Number | Name | Date |
|---|---|---|
| 1,166,261 | Rogers | Dec. 28, 1915 |
| 1,470,143 | Butterbaugh | Oct. 9, 1923 |
| 1,678,207 | Brandt | June 24, 1928 |
| 2,030,280 | Vigliano | Feb. 11, 1936 |
| 2,426,124 | Skwierawski | Aug. 19, 1947 |